United States Patent Office 3,335,170
Patented Aug. 8, 1967

3,335,170
4-SUBSTITUTED DIPHENYLMETHANES AND PROCESS FOR PREPARING SAME
Alan F. Ellis, Pittsburgh, Pa., assignor to Gulf Research & Development Company, Pittsburgh, Pa., a corporation of Delaware
No Drawing. Filed Dec. 3, 1963, Ser. No. 327,843
4 Claims. (Cl. 260—471)

This invention relates to linear heterodifunctional diphenyl methanes selected from the group consisting of 4-(4'-carbomethoxybenzyl) benzamide and 4-(4'-hydroxymethylbenzyl) benzylamine as new compounds and to a new process for preparing the same.

In preparing the desired 4-(4'-hydroxymethylbenzyl) benzylamine, the new compound, 4-(4'-carbomethoxybenzyl) benzamide, is also prepared, and it is in this fact that the procedure defined herein is unique. The defined intermediate compound is prepared by reacting 4,4'-dicarbomethoxydiphenylmethane with ammonia in a lower alcohol, such as methanol, ethanol, isopropanol, etc., particularly methanol, at a temperature of about 0° to about 100° C. and a pressure of about 20 to about 200 pounds per square inch gauge. Methanol is also produced in the process. The amount of ammonia required is at least the stoichiometric amount required to react with one of the carbomethoxy groups on the 4,4'-dicarbomethoxydiphenylmethane. While amounts of ammonia far in excess thereof can be employed, for example, up to two or three times the stoichiometric amounts required for reaction with both carbomethoxy groups on the charge, I have found, unexpectedly, and desirably for the present purpose, that only one of the carbomethoxy groups on the charge will react with the ammonia. This is unexpected, for the closely similar compound, 4,4'-dicarbomethoxybenzophenone, when reacted with ammonia will result in the production of the corresponding diamide, benzophenone, 4,4'-diamide, instead. Additionally, I believe that diphenyl methanes having ester groups having more than one carbon atom in the 4,4'-position, or ester groups of any kind, on the other positions on the ring will not react with ammonia to form a desired ester amide diphenyl methane. The amount of time required for the reaction is not critical, but is dependent upon the amount of charge that is desired to be converted to 4-(4'-carbomethoxybenzyl) benzamide. Thus a period of about 60 minutes will result in reaction of a small amount of charge, while a period of about 24 to about 60 hours will result in substantial conversions of the charge to the desired ester amide.

The recovery of the desired ester amide from the unreacted charge is relatively simple. Since the product is soluble in the solvent, while the charge is not, simple filtration will suffice to separate the two. In so doing unreacted ammonia is inherently removed from the system. The filtrate obtained is evaporated and a solid, crystalline ester amide is obtained.

The desired 4-(4'-hydroxymethylbenzyl) benzylamine is obtained by hydrogenating the intermediate compound obtained above, 4-(4'-carbomethoxybenzyl) benzamide in the presence of a suitable hydrogenation catalyst that is effective for reducing carbomethoxy and amide groups to alcohol and amine groups, respectively, without hydrogenating the rings. Suitable reducing agents for this purpose are metal hydrides such as lithium aluminum hydride, lithium aluminum hydride-aluminum chloride, aluminum hydride-aluminum chloride, sodium borohydride-aluminum chloride, etc. The hydrogenation is effected by conducting the same in a suitable solvent for the charge and for the reducing agent, such as diethyl ether, tetrahydrofuran, etc. at a temperature that maintains the solvent at a gentle reflux and for about 30 to 60 minutes after addition is complete. The desired amide alcohol is recovered from the reaction mixture in any suitable manner, for example, by treating the hydrogenation product with sufficient inorganic acid to decompose the product-reducing agent complex. The aqueous solution of amine salt so obtained is then washed with a solvent, such as benzene, and made alkaline by the addition of an alkaline reagent, such as aqueous sodium hydroxide. The final alcohol amine product is then extracted with an organic solvent such as diethyl ether, chloroform or methylene chloride. This solution can then be washed with water, dried and evaporated to produce 4-(4'-hydroxymethylbenzyl) benzylamine.

The invention can further be illustrated as follows.

Example I

Into a two-gallon autoclave there was placed 800 grams of benzophenone 4,4'-dicarboxylic acid, five liters of methanol, 20 milliliters of concentrated sulfuric acid. This mixture was heated at a temperature of 135° C. and a pressure of 130 pounds per square inch gauge for four hours. From this product a quantitative yield of 4,4'-dicarbomethoxybenzophenone was recovered by filtration. The 4,4'-dicarbomethoxydiphenylmethane was obtained by hydrogenation in heptane at 190° C. and 1000 pounds per square inch gauge with a nickel catalyst for four hours.

A mixture of 100 grams of 4,4'-dicarbomethoxydiphenylmethane, 300 milliliters of methanol and 100 milliliters of liquid ammonia were charged into a chilled one-liter autoclave. The autoclave was sealed and the contents thereof were stirred at 50° to 60° C. and around 60 pounds autogenic pressure for 44 hours. The resulting slurry was filtered and the filtrate evaporated to give as the sole product of the reaction 22.0 grams of a compound identified by elemental analysis as 4-(4'-carbomethoxybenzyl) benzamide having a melting point of 197° to 198° C.

Example II

To 5.7 grams of pulverized lithium aluminum hydride in 430 milliliters of dry tetrahydrofuran there was added slowly a tetrahydrofuran solution of 15 grams of dry 4-(4'-carbomethoxybenzyl) benzamide obtained above. After the addition was complete, the resulting deep purple reaction mixture was stirred for 30 minutes and the complex present in the mixture was carefully decomposed with 10 percent aqueous hydrochloric acid. The aqueous solution of amine salt obtained was washed with 50 milliliters of benzene, then made alkaline with a two-molar aqueous solution of sodium hydroxide. The desired product was then extracted from the solution with 100 grams of chloroform. The chloroform solution was washed with water, dried and evaporated to produce 3.0 grams of a compound identified by elemental analysis as 4-(4'-hydroxymethylbenzyl) benzylamine having a melting point of 105° to 107° C.

That it is critical that the charge to the process must be 4,4'-dicarbomethoxydiphenylmethane in order to obtain the desired alcohol amide compound is apparent from the following.

Example III

A slurry of 100 grams of 4(4'-dicarbomethoxybenzophenone in 300 milliliters of methanol and 100 milliliters of liquid ammonia was charged to a precooled one liter autoclave. The contents of the reactor were stirred at 50° to 60° C. for 40 hours, then cooled, blown down and emptied to give a white slurry. This was filtered and the filtrate evaporated to give 5.1 grams of crude benzophenone 4,4'-diamide. The precipitate was dried to give 92 grams of unreacted starting material.

The new compound produced herein, 4-(4'-carbomethoxybenzyl) benzamide, is, as pointed out above, an intermediate for the preparation of the other new compound, 4-(4'-hydroxymethylbenzyl) benzylamine, also produced herein. The latter compound can be reacted with a diacid or derivatives thereof to form a linear polymer which can be used as a protective coating for metals. This is shown below in Example IV.

*Example IV*

A mixture of 0.2000 gram of 4-(4'-hydroxymethylbenzyl) benzylamine and 0.1612 gram of adipyl chloride in three milliliters of chloroform was placed in a test tube and warmed to 50° C. to promote the polymerization reaction. After 10 minutes the chloroform was allowed to evaporate, leaving behind 0.3012 gram of a yellow solid. This was shown to be polymeric by infrared analysis and solubility tests. The solid, which had a softening point of 210° C., was melt coated onto a steel surface to form an adherent protective coating thereon that was found to be insoluble in water, acetone and chloroform.

Obviously, many modifications and variations of the invention, as hereinabove set forth can be made without departing from the spirit and scope thereof, and therefore only such limitations should be imposed as are indicated in the appended claims.

I claim:
1. A process for preparing 4-(4'-carbomethoxybenzyl) benzamide which comprises reacting 4,4'-dicarbomethoxydiphenylmethane with ammonia at a temperature of about 0° to about 100° C. and a pressure of about 20 to about 200 pounds per square inch gauge.
2. A process for preparing 4-(4'-hydroxymethylbenzyl) benzylamine which comprises reacting 4,4'-dicarbomethoxydiphenylmethane with ammonia at a temperature of about 0° to about 100° C. and a pressure of about 20 to about 200 pounds per square inch gauge to obtain 4-(4'-carbomethoxybenzyl) benzamide and thereafter hydrogenating the latter in an ether solvent with lithium aluminum hydride to obtain 4-(4'-hydroxymethylbenzyl) benzylamine.
3. As a new compound 4-(4'-carbomethoxybenzyl) benzamide.
4. As a new compound 4-(4'-hydroxymethylbenzyl) benzylamine.

References Cited
UNITED STATES PATENTS
3,222,391   12/1965   Horan _____ 260—471

LORRAINE A. WEINBERGER, *Primary Examiner.*
L. ARNOLD THAXTON, *Assistant Examiner.*